Sept. 18, 1951 S. KASS ET AL 2,567,942
DIRECT ARITHMETICAL READING OF TARGET ANGLE VALUES
Filed July 1, 1946
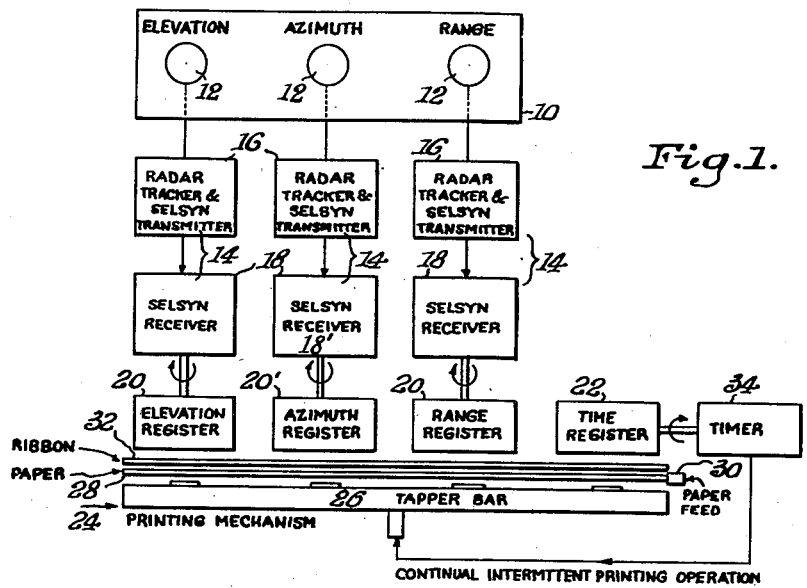
Fig. 1.
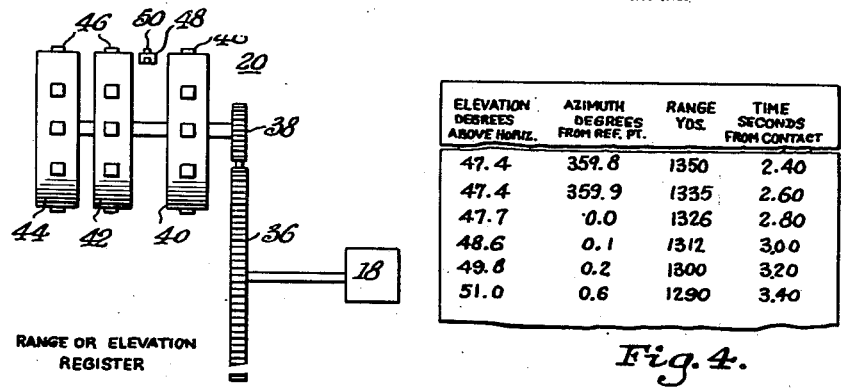
Fig. 2.
Fig. 4.
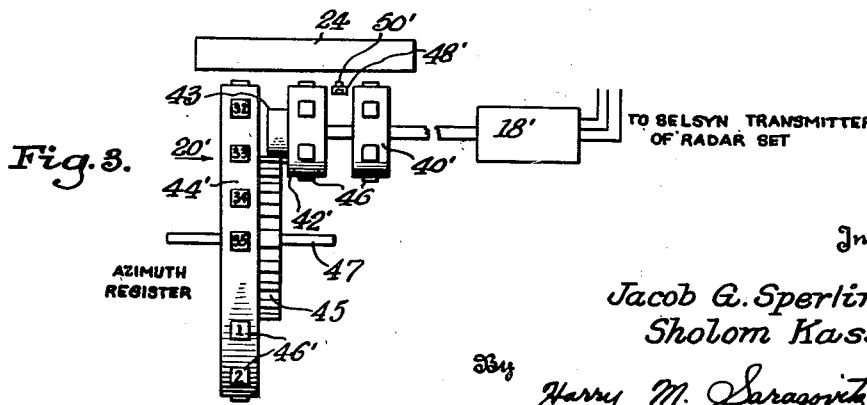
Fig. 3.
Inventors
Jacob G. Sperling
Sholom Kass
By Harry M. Saragovitz
ATTORNEY Patented Sept. 18, 1951

2,567,942

UNITED STATES PATENT OFFICE 2,567,942

DIRECT ARITHMETICAL READING OF TARGET ANGLE VALUES

Sholom Kass, Perth Amboy, and Jacob George Sperling, Asbury Park, N. J., assignors, to the United States of America as represented by the Secretary of War Application July 1, 1946, Serial No. 680,788

2 Claims. (Cl. 346—33)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to recording systems and constitutes an improvement on one feature of the invention disclosed in the co-pending application of Jacob George Sperling entitled "Radar Recording System," Serial Number 658,915, filed April 2, 1946, now abandoned, the specification and drawing of which is incorporated herein by reference.

In the said co-pending application of Sperling there is disclosed a system for recording positional information derived from a radar set and includes a Selsyn system, a plurality of counters driven by said Selsyn system and a printing mechanism whereby successive values registered on said counters may be permanently recorded. One of the counters used in said recording system is used to record azimuth values, which values so recorded are additive in excess of 360 degrees. Thus, if it should be necessary to track an object through more than one complete revolution about the radar set, an azimuth value of unusual form, such as 400 degrees, might be obtained. This reading of 400 degrees would mean that the object was then 40 degrees past the reference point. However, such a reading is confusing and is apt to give rise to error. It is therefore an object of the invention to provide means whereby azimuth values may be recorded that will not require interpretation.

Among the most important uses of this invention is the registering of data for use in directing gun fire, and in the exact location of objects with respect to a given control point, so that geographic locations may be computed and firing data or instructions issued accordingly to gun stations, ships and airplanes or other units on missions or for organizing undertakings. For these purposes, the prior mapping of an area, or the display of a line or symbols in which one element is represented at a distance from a reference point which corresponds to the actual distance between two points on the earth in a known ratio, are only beginnings in the measurement and computation of the actual arithmetic number representing the location of a detected object. They are crude and indefinite to such extent that large elements of error occur in endeavoring to build from them a mathematical value which can be used with certainty in computations. My prior application, above identified, still required some computation before the exact number could be obtained if a tracking operation extends over more than 360 degrees. No other apparatus or systems were available which would attain the end of presenting the exact figures desired which could be simply transferred from the apparatus or system at any instant that the firing or director computation required. As a result, in some situations, the few seconds required to deduce the specific number from the data presented, especially in the case of fire control, made the derived number lacking of current effect and value by some amount which had to be estimated and added or included in the allowances for "dead time."

The present application presents a system which accomplishes the full achievement of presenting definitely the number to be used in a computation to which the apparatus named is specially pertinent. That is to say, if equations require the interpolation of a certain angle stated in degrees and fractions, that number and fraction of degree will appear in the record made by my apparatus, ready to transfer just as it should be entered in a computing machine, or as it should be written on paper in an equation.

These objects, together with other objects and advantages of the invention which will be apparent to one skilled in the art, are achieved in the instant embodiment of the invention by means of a counter including a special disc calibrated from 1–35, the portion of the said disc that would ordinarily be provided with the number "zero" being left blank.

For a better understanding of the invention, reference is made to the following specification of a device embodying the invention, the said specification to be read in connection with the accompanying drawing in which there is shown in Figure 1 a block diagram as in the prior application, of a system in which our invention is embodied.

Figure 2 is a schematic elevation of a conventional set of counter or accumulator wheels in said application as a part of a printing register.

Figure 3 is an enlarged schematic elevation of our azimuth printing register or counter.

Figure 4 is a fragmentary view of a printed record made with the instant machine, during the course of an imaginary tracking operation in which a "crossing target" has passed the zero reference point in azimuth.

In this specification the term "Selsyn" refers to a servo element or system comprised in a class of such devices now generically designated as "synchro," comprising motion reproduction devices used for electrical transmission of angular positions of some rotatable member to another remotely located rotating member. These devices and systems are extensively available in commercial forms and are known by various trade names or trade-marks, as Autosyn, Magnesyn, Syncrotie, Diehlsyn, Siemens, Selsyn, etc. Theoretically, a synchro device as a class including those under the trade-marks named, is treated as a salient-pole bipolar alternating-current-excited synchronous machine. A typical form is a two-pole single-phase A. C.-excited rotor field and a Y-wound single phase variable voltage stator. Such a synchro or Selsyn whose rotor is geared to or otherwise linked with and driven by or with mechanical equipment—for instance, a scanner—is also alternatively called a transmitter, generator, Selsyn generator, or synchro generator. The remote indicator responsive to movement of the rotor of such transmitter is called a receiver, motor, synchro-motor, Selsyn motor, or the like. In one form it has an armature, A. C.-excited in phase with the A. C. of the transmitter, that is free to rotate in a 3-pole stator field energized by the Y-wound transmitter stator and is damped to prevent excessive oscillation before coming into correspondence with the rotor of the transmitter. These devices are also known as synchronous units, or self-synchronous units. Because the device known by the trade-mark name of "Selsyn" was used in the first operative device embodying the invention herein, that name has been applied to the elements so involved in this disclosure, as a designation of a class of devices of known structure and function.

Referring to the drawing, and particularly Figure 1, there is shown a radar data displaying set 10 having a plurality of indicators 12 which are conveniently cathode ray oscilloscopes adapted to indicate in a conventional way elevation, azimuth, and range respectively. These are electrically connected to Selsyn and tracking or other necessary means generally included under the designation "radar" for representing the data involved in range, or angular movement of a rotating member in the apparatus generally indicated at 16. Means available for these purposes being well known, they are not shown or described in detail. "Tracking" as referred to in the said prior application and herein, involves a rotatable line-of-sight device with an axis of sight or beam which is kept trained on a target or object; and for the purpose of this application may be the conventional system wherein in a Selsyn generator or transmitter at 16 is fixed to an axial rotating, pointing, tracking or scanning part of the line-of-sight device so as to generate a directional field intensity which is here transmitted electrically to a motor or receiver Selsyn 18 (the middle unit 18' of Fig. 1) to reproduce the azimuthal position of the transmitter rotor. From the rotor in the element 18', mechanical operation of azimuth printing counter 20' (to be described hereinafter) may be effected conventionally. Counters 20 for elevation and range may be similarly operated from the left and right elements 18, and may be simple decimal accumulator wheels diagrammatically shown in Fig. 2, with raised printing numbers 46 and conventionally coupled so that rotation of a first wheel will register ten successive values at a given position, and on each turn will "carry" one digit on the next wheel, and so on, as in common forms of odometers. The necessary interconnections being common and largely used, are not illustrated in detail.

In addition to the "counters" for elevation, azimuth, and range, there is also provided a similar register or counter for time, at 22, operated mechanically from a timer unit 34. The four registers or counters are aligned so that the register position or printing position of the numbers on the wheels of all the registers will be in a line and plane for printing simultaneously.

A printing mechanism 24, comprising a tapper bar 26, a roll of paper 28 whose movement is controlled by a motor 30, and a printing ribbon 32, the said bar, paper and ribbon being disposed in parallel spaced relationship, is mounted parallel to and in close proximity with the counters 20 and 22. The tapper bar 26 is adapted to move periodically toward the counters 20 and 22, whereby the values then existing on the said counters will be printed on the paper 28. The printing mechanism 24 is well known in the art and no claim is made herein to a printing mechanism per se.

A timer 34, comprising a source of periodically delivered energy having a predetermined repetition rate, is mechanically connected to the time printing counter 22 whereby the said counter may show successive intervals of time. The timer 34 also serves to actuate periodically the tapper bar 26, in a manner well known in the art.

Referring to Figure 2, the printing counter 20 is connected to its respective receiver 18 through a pair of large and small meshed gears 36 and 38. It comprises discs or wheels 40, 42, and 44 geared together conventionally as before stated, and the numbers on each disc will read from 0 to 9. It will be apparent that the number of discs used in each printing counter 20, and in the time printing counter 22 will be determined by the numerical size of the greatest value to be recorded thereon. The counter 20' is distinguished in this respect, as will appear. The gears 36 and 38 of the counters 20 are designed to give a "fine" reading on the first disc, which will be rotated once for every degree of movement in elevation of the tracker, although other ratios may be adopted to fit different fractional parts of the units to be registered, if required, or, in the range register, fractional readings may be omitted if desired. It thus becomes desirable to print a decimal point in the printed data, and for this a stationary bar 48 is fixed suitably between the discs 40 and 42 and provided with a decimal point character 50 presented so as to be constantly in line with the numbers 46 located at the printing positions. In order to coordinate the printing operation with the movements of the time register, the timer is constructed so as to operate the counter 22 once for each unit of time registered, shortly before the timer actuates the tapper bar 26.

In the said prior application the counters were all described as similar to each other, differing only in the number of wheels required in proportion to the maximum total number to be registered. This complication is overcome in the present azimuth counter, in addition to coordinating the registering function with orientation and time in a new way.

Referring to the drawing, Figure 3, an improved register, accumulator, or counter 20' is formally shown which is intended to be operated from the azimuth receiver or motor Selsyn 18' of Figure 1, replacing the counter 20 shown at that place in the prior application.

The motor Selsyn 18' is represented formally in driving relation to the first counter wheels or discs 40' and 42' (corresponding to the discs 40 and 42 of Fig. 2), the intermediate gearing disclosed in Figure 2 being omitted for convenience in illustration, although such gearing may not be required in either counter if the Selysn system 14 is arranged to transmit a "fine" reading. The second counter disc 42' may be operated conveniently and decimally from the first disc 40', the latter denoting fractions, and a decimal point 50' carried by a stationary bar 48' is shown in the printing position, having the same function as the devices 48 and 50 in the counters 20 first described. Consequently, the first disc will print from .0 to .9 and the second disc will print from 0. to 9.

The disc 44' is calibrated with printing members 46' from 1 to 35, the portion of the periphery of the disc 44' that would normally bear the number zero being left blank, since, for small angles, the counter would otherwise print a reading such as 09.2 degrees.

A suitable gear arrangement is provided to connect operatively the discs 42' and 44' and, in the embodiment shown comprises a small single tooth throw gear 43 fixed to and co-axial with disc 42' and a large gear 45 fixed to and co-axial with the disc 44', the arrangement being such that the disc 44' will be triggered over one number step by each complete revolution of the disc 42'.

In order that the numbers 46' on the disc 44' may be large enough to be printed and read easily, the disc 44' is proportionally larger in diameter than the discs 40' and 42'. The disc 44' is therefore not mounted axially with the discs 40' and 42', but rather is mounted on a special axle 47 that is displaced with respect to the axis of the discs 40' and 42'. The two said axles 28 and 30 are supported by the frame (not shown) of the counter 12.

There has thus been provided a counter adapted to read azimuth angles wherein the total azimuth reading will never exceed 359.9 degrees. When 359.9 degrees have been reached on the first revolution of wheel 20, continued rotation of the Selsyn rotor at 18' will move discs 40' and 42' to register zero, thus: 0.0, and the next reading will be 0.1 degree. It will be obvious that this method will eliminate possibility of error in azimuth readings. All azimuth readings will be seen in the accustomed figures just as they are used in equations, so that they may be transferred to paper or entered in a machine without change, ordinarily. Should it be desired to learn the number of revolutions through which the radar set has tracked the object whose instant angular position has been noted, this may be determined by simply counting the number of times the counter has gone through zero degrees, these being apparent in the printed record slip. This information, in special cases, may be utilized to obtain a definite factor of speed of the target or the like, but in many cases will not be required for initially directing fire and the like, because an approximate mentally-reckoned speed component is usually employed before sufficient data is registered.

Various ways of applying the invention to use will occur to those involved where the invention is desirable. After one manner of use, in operation, the radar circuits being energized (including the Selsyn circuits), the tracking devices being at the zero position in elevation and azimuth, the counters 20, 20', and 22 being set at zero, the Selsyns energized, and the range data transmitting system being in operation, the tracking apparatus is moved to align with the target or other object to be followed. As soon as "contact" is made, if not before, the timer is set in operation, recording the beginning of the target movement scanned or tracked, and from that time on the successive angular positions of the target in azimuth in relation to the reference or zero point will be given in degrees and fractions of a degree on each operation of the print mechanism 24, as well as the elevation and range.

As a result, the values of time, elevation, azimuth, and range may be read directly from the paper 28 in such units as may be desired, in the present instance the angular positions being contemplated in degrees and fractions. The range may be represented in feet, mils, yards or other units, according to conventional organization of the range transmitting means, and the time may be represented in seconds and fractions of seconds.

The position of the tracked object is given mathematically at instants of time with uniform intervals over a series, of such length as desired or permissible by the nature of the activity. In some cases this set of data gives a mathematical system from which variables and constants not directly recorded may be determined, and at all times the instant values may be transferred directly into equations for various calculations.

That is to say, there will at all times be a record displayed substantially as shown in Figure 4, wherein the progress of time during an observation is shown, and the progression of the target in elevation and azimuth, and its instant position in those particulars, in uniform fractions of seconds and in exact degrees and fractions thereof. Thereby, for instance, a fire control officer may instruct a gun pointer to elevate a gun to the number of degrees in elevation shown in the first column and set it in azimuth to the position definitely and completely stated in the second column, plus components of dead time and lead derived from the time required by the gun pointer to act, the nature of the ammunition, and a projection of the course of the target derived by the continuous record in the uniformly repeated printings of the preceding data, including range, the last-named details being interpolated by the officer or by some computing apparatus, of which electronic forms are available for exceedingly fast completion of the data.

The immediate mathematical display of the actual azimuth angle position of a target effected by the device of Figure 3, is particularly evident in the second column from the left in the example of a printed record produced by the invention, as shown in Figure 4. This is due to the perfection of the wheel 44' and its coordination with the decimal wheels 40' and 42'. The latter two operate as usual in a decimal counter, but the wheel 42' acts with the wheel 44' to repeatedly move the latter one unit thirty-seven times, when its blank space is registered at the printing line, and the wheels 40' and 42' each registers a cipher. With this device the wheel 42' will be so geared to the motion reproducing means at 18' that wheel 42' will make one complete turn for each degree of the reproduced motion of the tracker device by which the Selsyn transmitter 16 is operated. On each of its turns there is a carry over to the wheel 42', which prints digits to the left of the decimal point.

The record so printed is quite distinct from what would be printed where only a simple decimal counter is employed at the azimuth register, and the difference is essential in coordination with the components printed at the other registers to enable the complete computations usually involved in utilizing tracking information (for instance in gun pointing). In the use of a simple decimal counter for azimuth, in case the course of the target passes the reference point in azimuth, there would be printed figures in excess of "360" degrees, and they might include numbers all the way between 360 and 999.9, requiring the making of allowances or corrections, with the certainty that at times confusion and error would occur. In the case of an airplane target, it might circle around the observation point several times. On the contrary, the record of azimuth will always print the exact angle then the target crosses the radius of the reference point, beginning "0.1" and so on, the number printed never exceeding "365.9."

We claim:

1. A system for tracking aerial moving objects and arithmetically representing the components of direction and motion and time in the movement of a target object comprising a tracker system, a motion reproducing system operatively connected and synchronized with a tracker in the tracker system to reproduce angular movements of such tracker in azimuth and elevation, a printer accumulator counter operatively connected with said motion reproducing system constructed to register continually angular values of existing elevational positions of the tracker in fractions of a degree, a range registering means operatively connected to the said tracker system including a printer accumulator counter and operative to continually register on said counter the range of a tracked object in units of distance, and an accumulator counter operatively connected with said motion reproducing system and constructed to continually register existing and successive azimuthal positions of the tracker, a time printer register device constructed to continually register current time in successive small fractions of time units, all of said printer-accumulator counters being positioned to print at a common line, means to operate the time register intermittently and continually at uniform intervals of said small fractions of time units, a printing device operatively associated with all said printer counters to print the values registered on them all simultaneously, and operative connections between the means to operate the time register and said printing device, to operate the latter on each interval in the operation of said time register.

2. In the system of claim 1, an azimuth angle register and printer comprising a rotatable member representing an existing azimuthal position, a counter means therein comprising a first decimal register wheel operatively connected to said rotatable member to turn once for each degree of angular motion of the rotatable member, a second decimal register wheel in accumulator relation to said first decimal wheel, and a third register wheel in accumulator relation to the second decimal register wheel, all said register wheels having their peripheries aligned at one side for simultaneous printing upon a surface presented thereto, the second decimal register wheel and third register wheel having tooth and gear connection in a relation whereby the second decimal register wheel will move the third register wheel one unit of angular registering movement of the latter wheel on each of thirty-six successive turns of the second decimal register wheel, and repeat, said third register wheel having printing number characters thereon representing in succession numbers from one to 35 and one blank space between 35 and one, all said numbers and said space on said third register wheel being at equal intervals therearound so as to register with said aligned side of all said register wheels at respective angularly spaced positions of the third register wheel in its movement by said second decimal register wheel.

JACOB GEORGE SPERLING.
SHOLOM KASS.

REFERENCES CITED

The following references are of record in the file of this patent:

UNITED STATES PATENTS

| Number | Name | Date |
|---|---|---|
| 425,581 | Reinhardt | Apr. 15, 1890 |
| 473,113 | Gott | Apr. 19, 1892 |
| 637,109 | Haddad | Nov. 14, 1899 |
| 750,086 | Carroll | Jan. 19, 1904 |
| 809,378 | Kay | Jan. 9, 1906 |
| 1,054,398 | Deckert | Feb. 25, 1913 |
| 1,323,381 | Schuppe | Dec. 2, 1919 |
| 1,371,138 | Bair | Mar. 8, 1921 |
| 1,865,553 | Berger | July 5, 1932 |
| 2,239,460 | Levy | Apr. 22, 1941 |
| 2,326,219 | Hayward | Aug. 10, 1943 |
| 2,392,467 | Engel et al. | Jan. 8, 1946 |
| 2,395,351 | Sohn | Feb. 19, 1946 |
| 2,403,562 | Smith | July 9, 1946 |
| 2,420,808 | Bliss | May 20, 1947 |